July 18, 1961 A. CHAUSSON 2,992,692
INSTALLATION FOR GUIDING ROAD VEHICLES
Filed Aug. 13, 1957 5 Sheets-Sheet 1

INVENTOR.
ANDRÉ CHAUSSON
BY
Reynolds, Beach & Christensen
ATTORNEYS

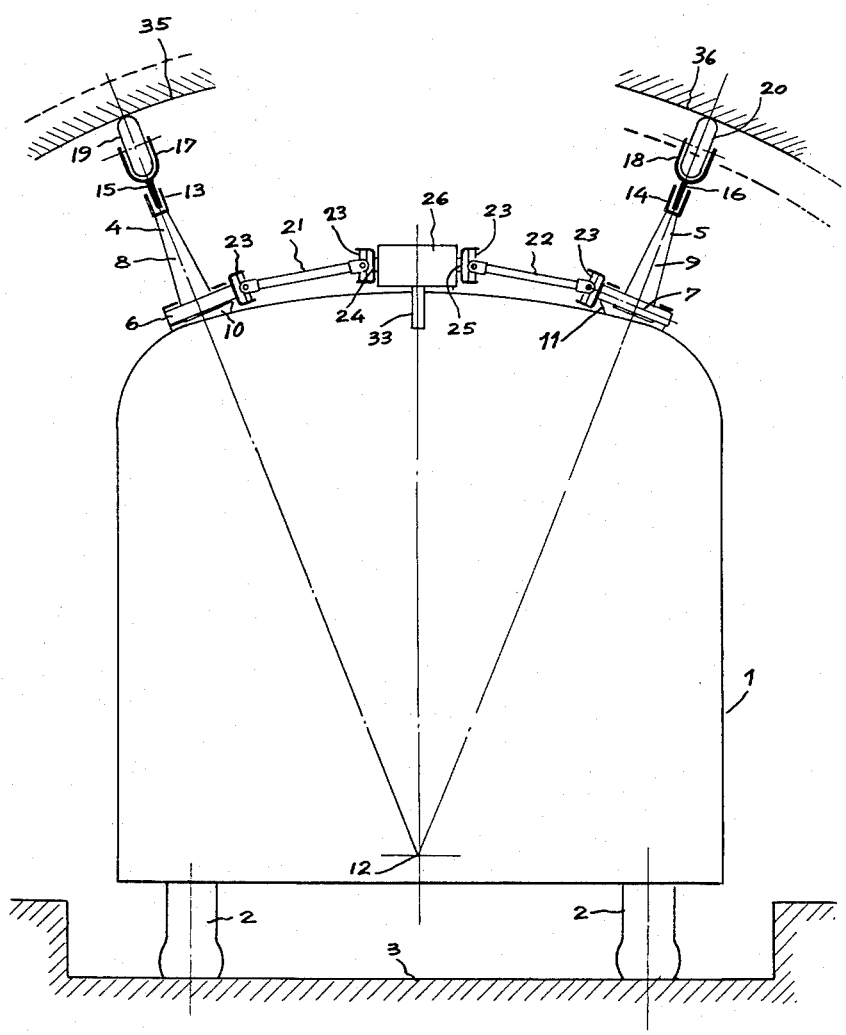

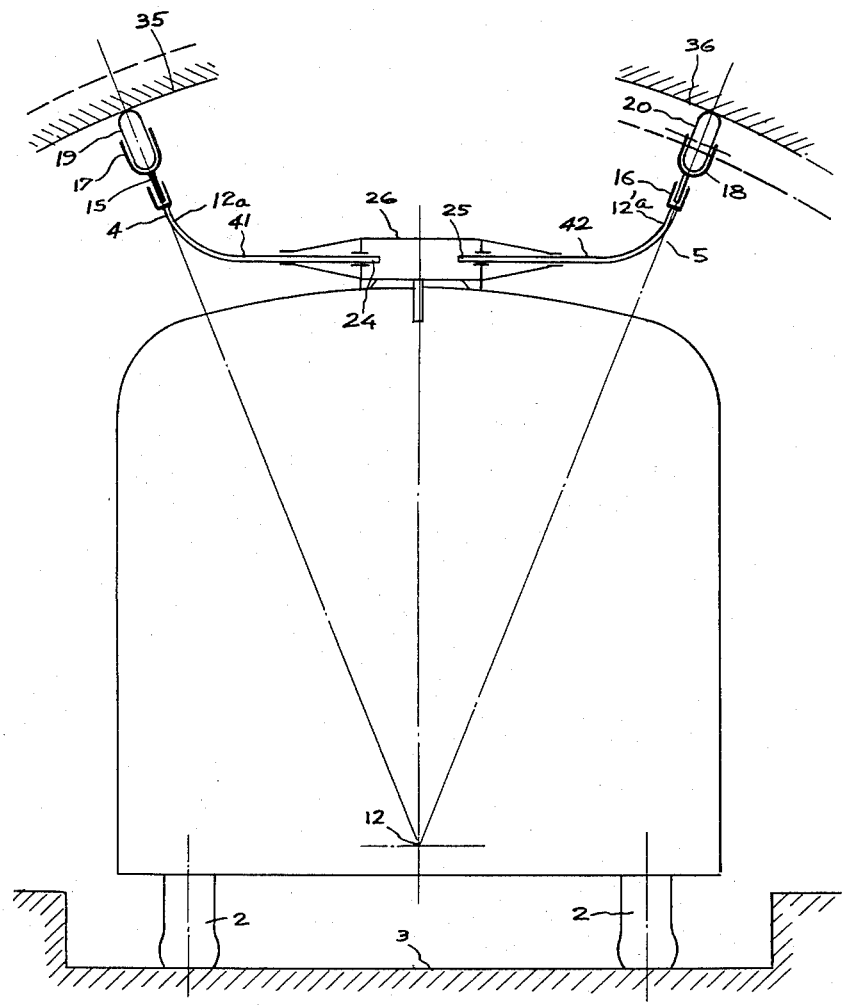

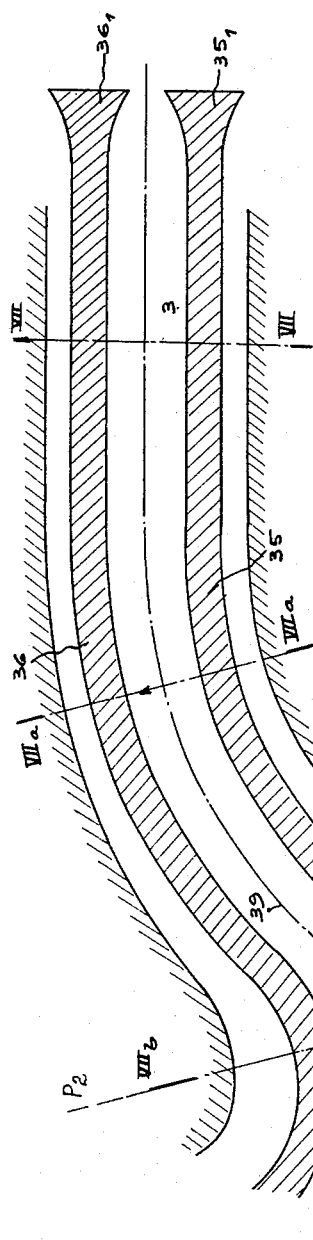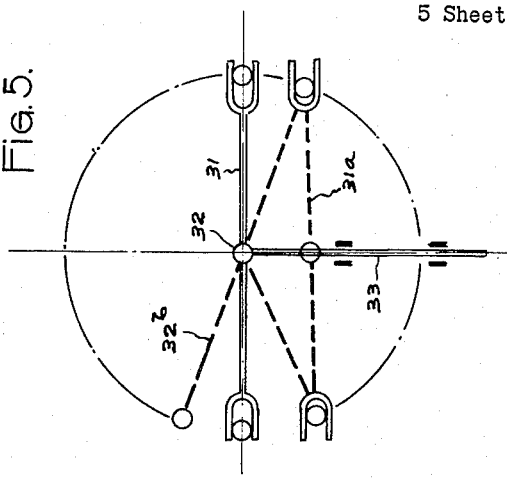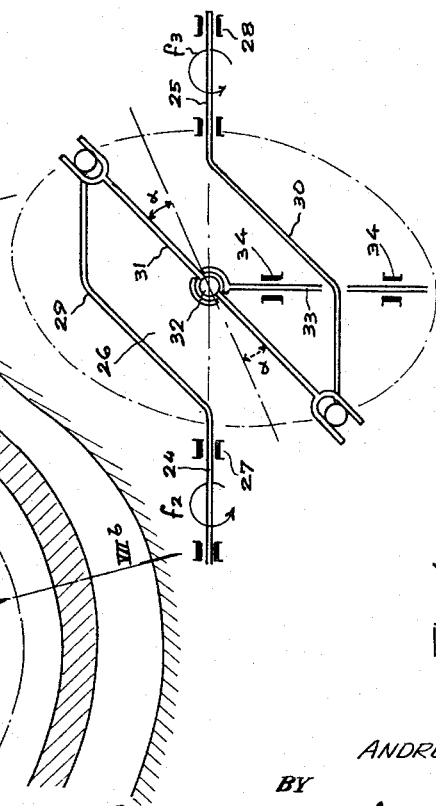

July 18, 1961
A. CHAUSSON
2,992,692
INSTALLATION FOR GUIDING ROAD VEHICLES
Filed Aug. 13, 1957
5 Sheets-Sheet 5
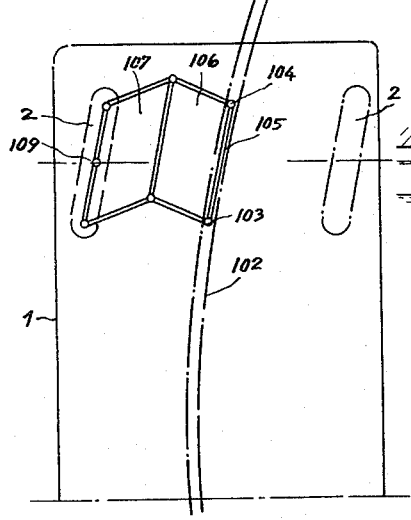
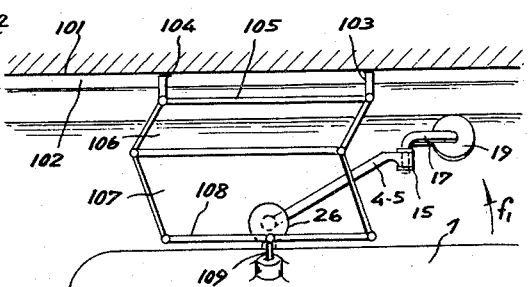
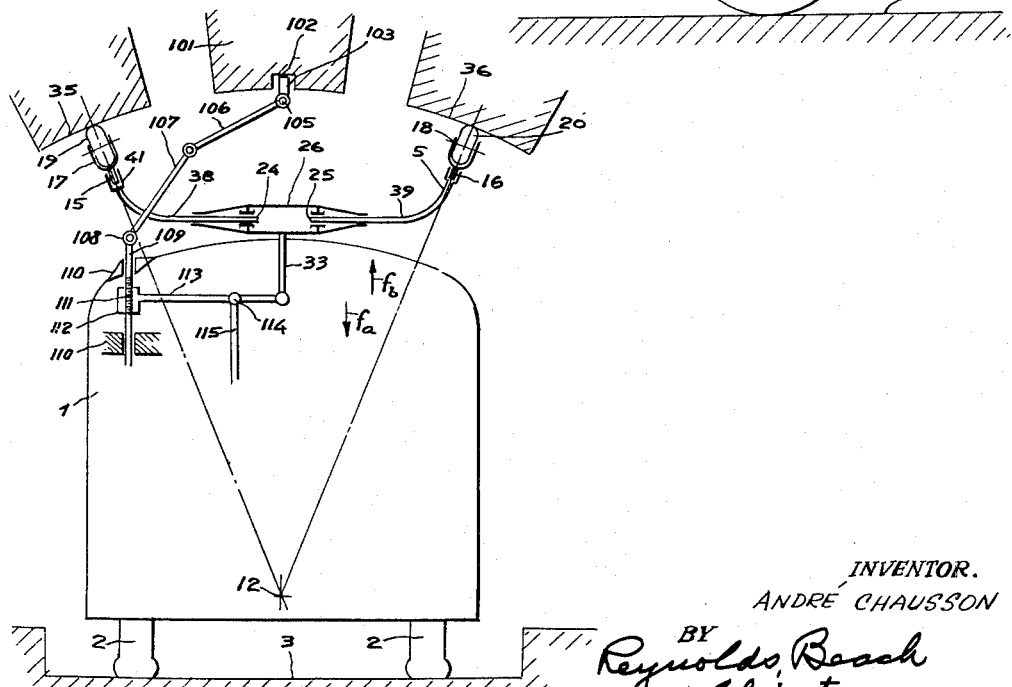
INVENTOR.
ANDRÉ CHAUSSON
BY
Reynolds Beach
& Christensen
ATTORNEYS

United States Patent Office 2,992,692
Patented July 18, 1961

2,992,692
INSTALLATION FOR GUIDING ROAD VEHICLES
André Chausson, Asnieres, France, assignor to Societe Anonyme des Usines Chausson, Asnieres, France, a French company
Filed Aug. 13, 1957, Ser. No. 677,972
Claims priority, application France Sept. 4, 1956
12 Claims. (Cl. 180—79)

In certain cases it will be useful that a road vehicle, and more particularly a public transport vehicle, be directed or steered automatically for at least some part of its route, with a precision greater than could be provided by a driver.

This is especially useful where no other vehicular or cross traffic is present, as on an underground route, as it becomes possible to decrease the width of the tunnel, thus permitting a substantial diminution of the cost of the same.

This invention concerns an installation for automatic guidance of vehicles, having the advantage that it does not use any guiding element located on the roadway nor on the sides thereof, thus enabling the road to be used for non-guided vehicles, should this be required.

The installation, according to the invention, allows automatic correction of the path followed by the vehicle, to guide it along an intended path. The correction is not affected, neither by the variations in the load of the vehicle, nor by the rolling and leaning movements to which the vehicle might be subjected, particularly at curves.

These curves occur indifferently whether the roadway is flat or banked, and besides, the guidance elements, which are overhead in the installation according to the invention, can be used in either direction by the same vehicles.

The invention employs at least two guiding tracks located above the intended ground path of the vehicle, fixed in relation to that path, and disposed, in cross-sectional relation to the path, generally in an arc of a circle common to the two tracks, centered at the natural longitudinal rolling axis of the vehicle, with a follower in the nature of two rollers engaging the respective tracks, together with arms or linkage supporting the follower from the vehicle and operatively connected to the steering mechanism of the vehicle in such manner that variations in level, curvature, disposition, or other characteristic of the tracks, and hence of the rollers, relative to each other, as by departure from coincidence of the tracks from a common circular arc, will automatically effect a desired steering action.

Various further features of the invention will become clear on reading the following detailed description.

Embodiments of the device according to the invention are illustrated in the accompanying drawings, and are to be taken by way of illustration and explanation, and not by way of limitation. In these drawings:

FIGURE 2 is a schematic section on a larger scale, seen substantially along the line II—II of FIG. 1;

FIGURE 3 is a section similar to the FIG. 2, but showing a slight modification;

FIGURE 4 is a schematic perspective view of a part of the installation carried by the vehicle;

FIGURE 5 is an explanatory diagram illustrating the operation of the part of the installation shown in FIG. 4;

FIGURE 6 is a schematic plan, showing one embodiment of the fixed part of the installation;

FIGURE 8 is a schematic elevational section showing an alternative embodiment;

FIGURE 9 is a schematic elevation of certain elements of the embodiment of FIG. 8; and FIGURE 10 is a plan corresponding to FIG. 8.

Figure 1:
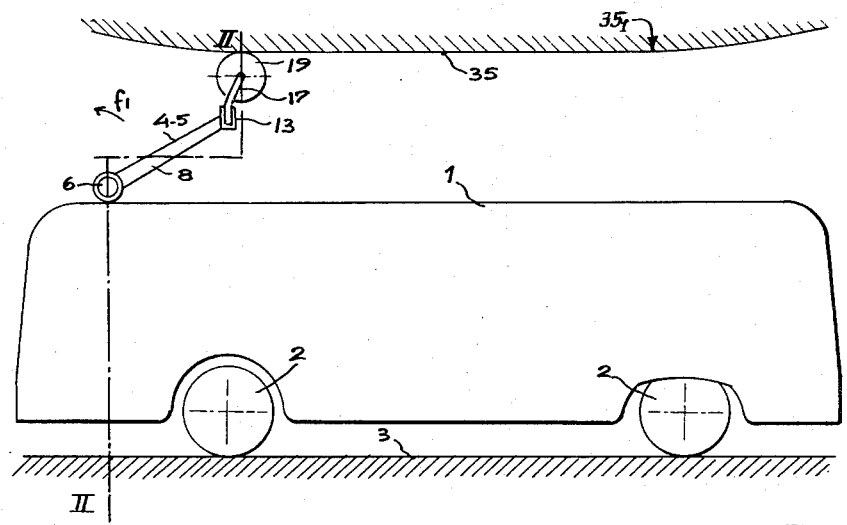
FIGURE 1 is a schematic elevational section of a vehicle traversing the installation according to the invention.

According to the embodiment shown in the drawings, the vehicle 1, provided with road wheels 2, traverses the pathway 3, which may be the pavement of a street or of a road, or the roadway of a tunnel.

This vehicle, which may be for instance a public transport vehicle, comprises an overhead follower device incorporating at least two follower elements identified as a whole by the respective numerals 4, 5.

In the example illustrated in FIG. 2, these follower devices are fixed to identical transverse shafts 6 and 7, which support trolley arms 8 and 9 respectively attached thereto, for rocking in upright but relatively inclined planes.

Shafts 6 and 7 for the support of arms 8 and 9 are supported in bearings 10 and 11 upon the roof of the vehicle 1. These bearings are mounted in such a way, that the longitudinal extents of the arms 8 and 9, and the planes defined by their swinging, converge towards each other in a point or along a line 12 (FIG. 2), the location of which is determined so that this point 12 is preferably in coincidence with the natural rolling axis of the vehicle. The location of this rolling axis is determined in a known manner by consideration of the position of the center of gravity and other characteristics of the vehicle like in the determination of the rolling axis of a boat or of a railroad vehicle.

The arms 8 and 9 end in their upper parts in upright sockets 13, 14 wherein are swiveled supporting pivots 15, 16 of the forks 17, 18 carrying trolley wheels or rollers 19, 20.

The shafts 6 and 7 are used to control the counter-shafts 21 and 22, which may be provided at each end with universal joints 23, these counter-shafts being connected to the respective inlet shafts 24, 25 (FIGURES 2 and 4) of a differential mechanism 26, which may be located on the top of the vehicle 1.

This differential mechanism can, for example, be arranged as shown in FIG. 4; in this embodiment the shafts 24, 25 supported in bearings 27, 28 constitute crank-shafts 29, 30 symmetrical to each other and connected by a connecting rod 31. The median part of the rod 31 is connected by a swivel, or similar member 32, to a slider 33, guided in slides 34. This slider 33, which is also schematically shown in FIGURE 2, is arranged for the control of the operation of the steering mechanism of the vehicle 1, both for intended deviation from a straight path and for automatic return to, after deviation from, the intended path.

Arms 8 and 9 are submitted to the action of resilient members, not shown in the figures, urging them always upwardly in the direction of the arrow $f_1$ (FIG. 1), in such a way that wheels or rollers 19, 20 will be kept in contact with overhead guiding elements 35, 36. These guiding elements 35, 36, which are preferably strictly identical to each other, consist of rigid bands or ribbons, metallic ones for instance, which are shaped (as more particularly seen in FIGS. 2 and 3) to outline, in the straight parts of the pathway, parts of the arc of a common circle, the center of curvature of which approximately coincides with the point 12, towards which converge the longitudinal extents of the arms 4, 5, and which include the rolling or lateral rocking axis of the vehicle.

These guiding elements 35, 36 are supported by suitable devices, not shown, which can be designed in numerous ways, and which are themselves secured to overhead installations or poles or to the vault 37 (FIG. 7) of a tunnel 38, through which the vehicle is to be driven.

The two guiding elements 35, 36 extend longitudinally in parallelism to the intended pathway, the axis or median line whereof is shown at 39 in FIGURE 6, and transversely they are always equidistant from one another. They are so arranged that in the curved portions of the pathway one is at a higher elevation than the other. It is this difference in elevation that produces the automatic steering action, in a manner described in detail hereinbelow.

Figure 7:
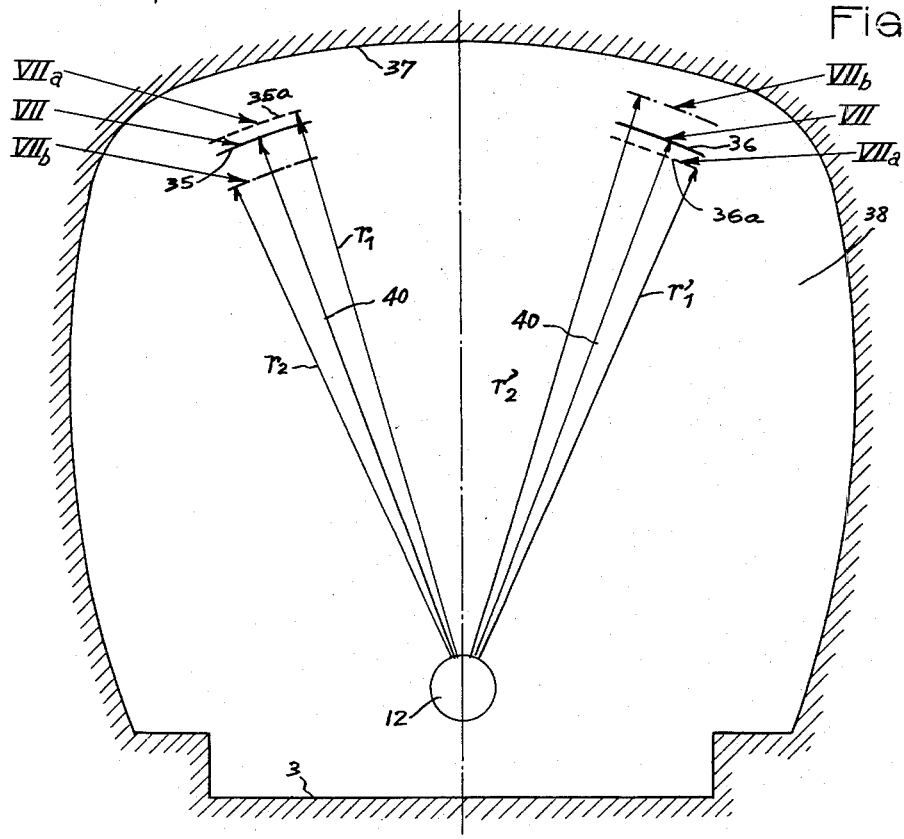
FIGURE 7 is a cross section on a larger scale, showing some of the fixed elements of the installation seen respectively on the lines: VII—VII, VIIa—VIIa, VIIb—VIIb of FIG. 6.

FIGURE 7 illustrates the differences in height of the guiding elements 35 and 36, and the effect thereof. In the position shown in full lines the guiding elements or tracks 35, 36 are equidistant from the ground, and lie in a common circular arc about the point 12, as shown by the radii 40. This relationship exists throughout all straight portions of the pathway, and represents the relative disposition of the guiding elements at the section line VII—VII of FIGURE 6. To accomplish turning, one track, as 35, is elevated with relation to the other track, 36, or the latter is depressed, or both. If a left turn is wanted, it may be the track 35 that is raised to 35a, and track 36 that is depressed to 36a, see FIGURE 7, and this may correspond to the relationship at section VIIa—VIIa of FIGURE 6. Conversely, if a right turn is desired, the relative elevation of the tracks is reversed, as at VIIb of FIGURE 7, corresponding to the section so designated in FIGURE 6.

Difference in elevation as between the tracks 35, 36, and hence of the followers 19, 20 in contact therewith, is purposely accomplished, in the manner just described, but will also occur automatically upon unintended deviation from the intended path, whether in the straight portion thereof or in a curved portion. Should the vehicle be unintentionally displaced to the left, as viewed in FIGURE 7, the follower 19 along the track 35 will be depressed because of the curvature of the vault 37, and the follower 20 along the track 36 will be elevated. Just as the intentional variation in relative elevation of the tracks produced a steering action, so the unintentional variation thereof will produce automatically a corrective steering action.

The angle to which the steering wheels must be turned is substantially inversely proportional to the radius of curvature of the intended path. The differences in level of the tracks 35, 36, to produce an intended curve, is such that the lengths of radii $r_1$, $r'_1$ (FIGURE 7) are substantially inversely proportional to the radius of curvature $\rho_1$ (FIGURE 6) or $\rho_2$, as the case may be, of the curved path of the vehicle. Radii $r_2$, $r'_2$ bear a like relation to the radii $\rho_1$ or $\rho_2$.

Assuming, in the example shown, that the guiding element 35 is raised to occupy the position 35a and that the guiding element 36 is lowered to occupy the position 36a, it follows that the arm 8 pivots in the direction of the arrow $f_1$ (FIG. 1) and that the arm 9 pivots in the direction opposite to this arrow. This pivoting motion being transmitted by the counter-shafts 21, 22 to the differential mechanism 26, the inlet shafts 24 and 25 thereof are rotated in the respectively opposite directions shown by arrows $f_2$, $f_3$, see FIG. 4.

This motion is transformed by the crank shafts 29, 30 into a translating motion which lowers the connecting rod 31 from the position shown in full lines in FIG. 5 into the position shown in broken lines in that figure, and referred to by the numeral 31a. This displacement of the connecting rod 31 is transmitted by the swivel 32 and the slider 33 to the steering mechanism of the vehicle, including a lay shaft (not shown) or to the servo control for the same, to act on the steering wheels, so as to pivot said wheels to an extent such, that the average turning angle is inversely proportional to the radius of curvature of the curve to be followed.

The section VIIb—VIIb of FIG. 6 is made in a curvature of the track 3, this curvature being in a direction opposite to that of the line VIIa—VIIa.

In the case of the curve, used for the section VIIb—VIIb, the average radius of curvature is presumed to be equal to $\rho_2$. In this case likewise, the guiding elements 35, 36 are displaced in height in relation to each other, so that the difference of radii $r'_2$—$r_2$ (FIG.7) will be substantially inversely proportional to the radius of curvature $\rho_2$.

In the latter case, the inlet shafts 24, 25 of the differential mechanism 26 are pivoted to a certain angle, in the opposite way to the one considered above, having the effect of raising the connecting rod 31, instead of lowering it, and will displace the slider 33 accordingly.

Considering the particular directional control system of the steering mechanism or of the servo control for the same, by the differential mechanism 26, or another type of mechanism similarly operated, the direction of the vehicle is not affected by the load carried thereon, as the angular variation of the arms 8, 9 in relation to the roof of the vehicle does not act on the differential mechanism in a direction such that it displaces the slider 33.

Indeed, assuming that both wheels or rollers 19, 20 are lifted simultaneously, or, which amounts to the same thing, that the body of the vehicle is lowered, the two shafts 6 and 7 pivot in the same sense and to the same extent, and consequently the inlet shafts 24, 25 of the differential mechanism are influenced in the corresponding manner, and the action of the one cancels out the action of the other.

In that case the connecting rod 31 is more or less tilted, to come, for instance, to the position shown in 32b of FIG. 5, a position in which the swivel 32, connecting it with the slider, is not displaced.

It will therefore be clearly understood, that the rolling movements to which the vehicle may be subjected around the rolling axis do not react on the directional control, as these movements do not modify the respective distances separating the point 12 from the guiding elements, as the center of curvature thereof is situated on the theoretical rolling axis of the vehicle.

As it also results from the particular arrangement of the installation according to the invention, the turnings which the vehicle might take, can indifferently be performed on a flat or a banked road, as it is sufficient for the guiding elements to be suitably placed in relation to this road.

The centrifugal power exerted on the vehicle during the turning does not modify its direction, because in that case the body of the vehicle tends to lean outwardly of the turning, but it pivots about the rolling axis at 12, which cannot change the direction, as explained earlier.

On certain routes followed by the vehicle, it might happen that the automatic guiding system, according to the invention, has not to be used on the whole of the route, but only on some parts thereof.

In that case, the vehicle is guided by usual means under the direct control of the driver. So that the later could easily engage the vehicle to be automatically controlled with a section of the track equipped with the installation of the invention, it is advantageous for the guiding elements 35, 36 to have enlarged end pieces, as has been shown in $35_1$ and $36_1$ in FIGS. 1 and 6, said end pieces being flared, so that the wheels 19, 20 need not be forcibly engaged, but on the contrary are brought smoothly to the positions they should occupy.

Because of the complete symmetry of the guiding elements 35, 36 and of the vechile-carried members, the direction in which the vehicle is advancing in relation to the guiding elements has no influence on the vehicle's direction, thus enabling the same sector of the track to be used for movement in either direction.

FIGURE 3 illustrates a slightly modified embodiment, according to which the wheels or rollers 19, 20 supported by the forks 17, 18 are connected by the pivots 15, 16 thereof, to curved shafts 41, 42, these being integral with the inlet shafts 24, 25 of the differential mechanism 26.

As can be clearly seen in FIG. 3, the curvature of the shafts 41, 42 is alike but reversed, so that the planes defined by the wheels 19, 20 converge towards the point or line 12, in a way similar to the arms 8 and 9 of the device of FIG. 2. The embodiment of FIG. 3 permits substantial simplification of the mechanism described in respect to FIG. 2.

According to alternative embodiments shown in FIGS. 8 to 10, elements similar to those described earlier are designated by the same numerals.

In this embodiment, both guiding elements 35 and 36 are still equidistant from one another, and from the point 12 so long as the vehicle travels along a straight path, and they extend longitudinally parallel to the intended path of the vehicle. Besides, these guiding elements are always at the same distance from the ground, whether the vehicle's path be straight or curved, this being contrary to what has been said about the earlier embodiment.

The differential mechanism 26, earlier described, is used to control a raising and lowering motion in a slider 33, which is no longer directly connected to the direction-controlling mechanism, as was the case before, but which is still indirectly connected therewith.

The installation comprises in addition an overhead guiding member 101, which may be located between the two guiding elements 35, 36, which has a guide such as a continuous groove 102, the orientation of which coincides with the intended path of the vehicle.

The numerals 103 and 104 represent longitudinally spaced fingers, which may be provided with rollers, and which are engaged in the groove 102. These fingers are carried by a transverse bar 105, forming one of the sides of a deformable parallelogram 106, carried by a second deformable parallelogram 107, the side 108 of which is secured on a shaft 109, guided in bearings 110.

The shaft 109 is threaded at 111 within a nut 112 at one end of a lever 113. The latter is fulcrumed at 114 upon a vertically sliding shaft 115, and its opposite end is connected to the slider 33 of the differential mechanism, 26. The sliding shaft 115 is operatively connected to the directional controls of the vehicle, directly or through servo mechanism. The sides 105 and 108 of the parallelogram linkages 106 and 107 remain always parallel to a tangent to the curvature of the groove 102 of guiding track 101 (see FIGURE 10), and hence to the curvature of the intended path of the vehicle. The arrangement is such that the parallelograms 106 and 107, as they rotate slightly clockwise or counterclockwise about an upright axis, as they follow the guide 102, effect corresponding rotation of the threaded shaft 109, which raises or lowers the nut 112 and tilts the lever 113 to lower or raise the sliding shaft 115 (assuming no movement of the latter at such time under the influence of relative movement of the followers 19, 20) and so to effect steering movement of the vehicle's steering mechanism. Displacement of the sliding shaft 115 in the sense indicated by the arrow $f_a$ (FIG. 8) may be assumed to effect a leftward movement of the vehicle, and in the sense of arrow $f_b$ a movement to the right.

Unintended departure of the vehicle from its intended path is still corrected by the guiding elements 35, 36. Lateral shifting of the vehicle to one side or the other of that path, because of the curvature of the tunnel, produces a change in their relative elevation, which in turn moves the followers 19, 20 vertically relative to one another, and results, as previously explained, in raising or lowering of the slider 33. Such movement lowers or raises the sliding shaft 115, as the lever fulcrums at the nut 112, with appropriate actuation of the vehicle's steering mechanism.

The location of the fulcrum 114 of the sliding shaft 115 on the lever 113 can be chosen to give a greater or smaller action to the driving effect of the differential 26.

The invention is not limited to the embodiments described and illustrated in detail, as various modifications can be made, without exceeding its scope.

I claim:

1. Guiding installation for a road vehicle intended to follow a predetermined pathway comprising an overhead guiding means fixedly mounted with relation to the ground, and a follower device carried by said vehicle, said guiding means having at least two longitudinally guiding elements located above said vehicle and extending longitudinally in generally parallel relationship along such pathway, said guiding means having further in section the shape of an arc of circle the center of which intercepts the natural rolling axis of said vehicle, and said follower device comprising rollers engaging said guiding means, carrying arms for said rollers extending radially with respect to said guiding means, a rotatable shaft operatively connected to said arms to be actuated thereby and a differential mechanism actuated by said shafts and carried by said vehicle for operative connection to the steering mechanism thereof.

2. Guiding installation for a road vehicle intended to follow a predetermined pathway such as includes curved portions, comprising a guiding means fixedly mounted with respect to the ground and a follower device carried by said vehicle, said guiding means having at least two guiding elements located above said vehicle and extending longitudinally in parallel relationship along said path to be followed, said guiding elements being further spaced in height, one with respect to the other, by a distance inversely proportional to the radius of curvature of such curved portions, and furthermore shaped in section according to an arc of circle the center of which intercepts the natural rolling axis of said vehicle, and said follower device comprising followers engaging said guiding elements, carrying arms for said followers extending radially with respect to said guiding elements, rotatable shafts connected to said arms to be actuated thereby and a differential mechanism actuated by said shafts and carried by said vehicle, for operative connection to the steering mechanism thereof.

3. Guiding installation as set forth in claim 2 comprising further inclined flared termini at the ends of said guiding elements for guiding said followers into correct engagement with said guiding elements when engaging them.

4. Guiding installation for a road vehicle intended to follow a predetermined pathway which includes curved portions of known radii, comprising a guiding means fixedly mounted with respect to the ground and a follower device carried by said vehicle, said guiding means having at least two guiding elements located above said vehicle and extending longitudinally in parallel relationship along said path to be followed, said guiding elements being further spaced in height, one with respect to the other, by a distance inversely proportional to said radii of curvature of said curved portions, and furthermore shaped in section according to an arc of a circle the center of which includes the natural rolling axis of said vehicle, and said follower device comprising rollers engaging said guiding elements, carrying arms for said rollers extending radially with respect to said guiding elements, two rotatable shafts respectively connected to said arms to be actuated therefor, two cranks oppositely disposed and respectively rigidly connected to said shafts, a connecting rod, the ends of which are pivotally connected to said cranks, a universal joint at the middle portion of said connecting rod, and a slider actuated by said joint for operative connection to the steering mechanism with which said vehicle is normally provided, to control the same.

5. Guiding installation as set forth in claim 4 in which said arms carrying said rollers and said shafts actuating said two cranks are constituted by means of bent members having one end extending radially to said guiding elements and the other end aligned with the corresponding end of said cranks.

6. Guiding installation for a road vehicle intended to follow a determined pathway, comprising a guiding means fixedly mounted with respect to the ground and a follower device carried by said vehicle, said guiding means having two guiding elements located above said vehicle and extending longitudinally in parallel relationship along said pathway and a guiding member disposed in parallelism to said guiding elements, said guiding member having a longitudinally protruding portion and, said guiding elements being shaped in section according to an arc of circle the center of which intercepts the natural rolling axis of said vehicle, and said follower device comprising rollers engaging said guiding elements, carrying arms for said rollers extending radially with respect to said guiding elements, rotatable shafts connected to said arms to be actuated therefor, a differential mechanism actuated by said shafts, a movable slider connected to and shiftable by said differential mechanism, an expandable member engaging said protruding portion of said guiding member to follow it, a threaded shaft pivotally connected to said expandable member to be rotated by the latter when actuated, a threaded socket on said threaded shaft to be actuated thereby, a rod respectively connected by its ends to said threaded socket and to said slider, and an actuating rod pivotally connected to said rod for connection to and actuation of the steering mechanism with which said vehicle is normally provided.

7. Guiding installation as set forth in claim 6 in which said expandable member comprises two distortable parallelograms pivotally connected together along a common side, one of said parallelograms having one side connected to said threaded shaft and the other having its outer side provided with longitudinally spaced fingers engaging said protruding portion of the guiding member.

8. A directional control device for installation upon a steerable vehicle intended to traverse a ground surface along an intended pathway such as includes straight and curved portions, comprising overhead means simulating the intended vehicle pathway, said overhead means having portions at curves which depart from the position of the portions thereof throughout straight portions, relative to the ground surface; a pair of followers for mounting upon the vehicle, and engageable with the overhead means as the vehicle traverses such path, said followers being respectively and relatively displaced with respect to the ground into positions corresponding to the varying portions of the overhead means as they encounter the latter; an actuator for mounting upon the vehicle and for operative connection to the steering mechanism thereof; and means operatively connecting said followers and said actuator to transmit motion to the latter, to effect its departure from a normal position, such as it occupies during straight-ahead movement of the vehicle, to a left- or right-controlling position in accordance with relative movement of the followers initiated by said overhead means.

9. Means for guiding a steerable vehicle along a predetermined pathway, and for automatically correcting any deviation from such pathway, comprising two tracks spaced laterally and extending parallel to such pathway, and lying in a common arc transversely thereof, two followers carried by the vehicle in positions to engage and follow the respective tracks, mounting means for said followers allowing each to rise or to be depressed according as the vehicle is displaced laterally to one side or the other from its intended path, and an element operatively connected to said followers, for shifting automatically in one direction or the other in accordance with their relative movement, and arranged for automatic connection to the vehicle's steering mechanism, to actuate the latter for compensatory steering movement as a result of lateral displacement of the vehicle.

10. Means for guiding a steerable vehicle, as defined in claim 9, wherein the mounting means are arranged for movement of the respective followers generally in directions radially of the curvature of the track, converging at a common point.

11. Means for guiding a steerable vehicle, as defined in claim 10, wherein the point of convergence is located substantially at the rolling axis of the vehicle.

12. Means for guiding a steerable vehicle, as defined in claim 9, wherein the tracks are relatively displaced radially of their common arc in the curved portions of the track, to actuate the vehicle's steering mechanism for steering about such curved portions.

References Cited in the file of this patent

UNITED STATES PATENTS

| 2,125,590 | Smallwood | Aug. 2, 1938 |
| 2,664,830 | Kreibich | Jan. 5, 1954 |

FOREIGN PATENTS

| 437,037 | Great Britain | Oct. 23, 1935 |
| 499,694 | Great Britain | Jan. 27, 1939 |